C. A. FAUST.
WRITING POSITION ADJUSTER.
APPLICATION FILED NOV. 23, 1908.
945,026.
Patented Jan. 4, 1910.
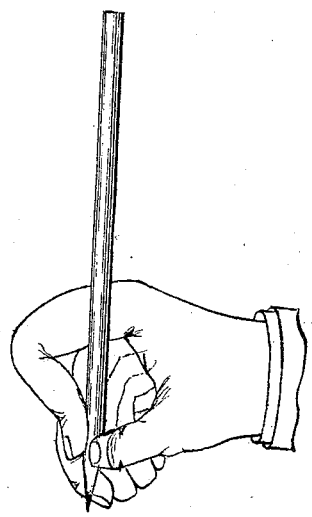
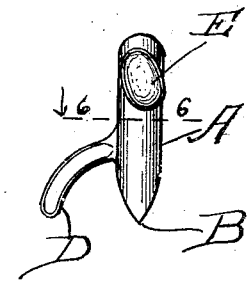
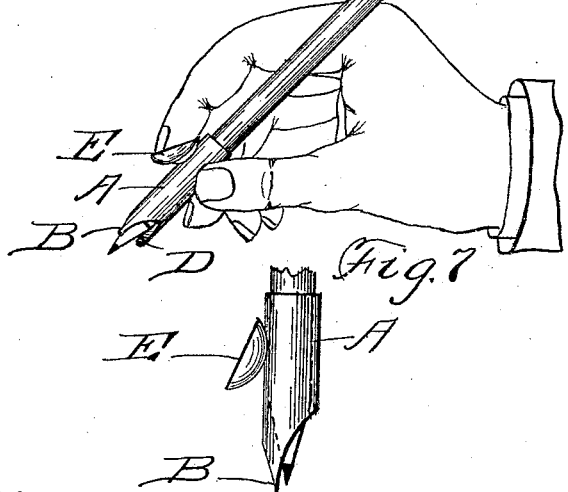
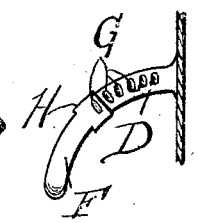
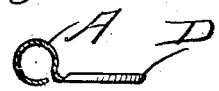
Witnesses
J. W. Angell
John Grant
Inventor.
Charles A. Faust.
W. E. Williams
by
Atty.

UNITED STATES PATENT OFFICE.

CHARLES A. FAUST, OF CHICAGO, ILLINOIS.

WRITING-POSITION ADJUSTER.

945,026.  Specification of Letters Patent.  Patented Jan. 4, 1910.

Application filed November 23, 1908. Serial No. 464,035.

*To all whom it may concern:*

Be it known that I, CHARLES A. FAUST, a citizen of the United States, residing at Chicago, in the county of Cook and State of Illinois, have invented a new and useful Improvement in Writing-Position Adjusters, of which the following is a specification.

The object of my invention is to provide a device, for the use of children or others who are learning to write properly, that will induce a correct position of the fingers and the hand to the end that the pupils will find the correct position more natural to them than a cramped position usually met with beginners in writing.

Reference will be had to the accompanying drawing in which—

Figure 1 is a view of an incorrect writing position usually assumed by beginners. Fig. 2 is the correct position for writing induced by my invention. Fig. 3 is the plan of my device. Fig. 4 is a detail of the adjustment for the guiding leg. Fig. 5 is a longitudinal sectional view of the device. Fig. 6 is a cross section on line 6—6 of Fig. 3. Fig. 7 is a view showing how the invention prevents one class of bad positions.

In the drawing A indicates the simplest form of my invention and it is composed of a metal clip or tube that slides neatly and closely upon the end of a pencil or pen and is retained in place by frictional contact. This tube A is provided with a point B, which may be adjusted when required so far down as to make writing unsuccessful, as shown in Fig. 7, except when the writing instrument is inclined backward like the correct position shown in Fig. 2.

On the side of the tube A there is a projection D here shown as made integral with the body of the tube but it may be made in any suitable manner. The purpose of this projection is to keep the fingers from getting down too closely to the end of the pencil or pen and also to prevent an inclination of the writing instrument too far sidewise, in which event, the end D would ride on the paper and cause the writing point to lift off the paper when the sidewise limit of inclination was reached.

On the top of the tube A there is a finger tip rest or socket E which invites the attention of the beginner so that he instinctively puts the finger into this socket or rest and thereby assumes the correct writing position at the start. This finger tip seat E is located the right distance from the writing point, a great desideratum for when the writing instrument is gripped too near the writing end, the fingers shut out the view of the writing and to see what is being written the hand is turned over too far, crowding the fingers under the hand producing a cramped, disastrous position.

It may at times be desirable to adjust the length of the leg D longer or shorter and to that end I make an adjustable extension F which slides over the leg D and is retained in any given position by means of indents G which are made male and female in the piece F and leg D and are held together by the elastic embrace of the sides H of the piece F.

With this device the student is induced to assume the correct writing position which in a short time becomes the natural one and thereafter the device is not needed.

In the event that the student persists in using the pencil or pen in the position of Fig. 1, my device may be so adjusted to the full downward limit on the writing instrument that the point B will come in contact with the paper slightly in advance of the writing point of the instrument and then in order to write at all the pencil must be inclined backward approximately to the position shown in Fig. 2, and this arrangement of the point B is provided for just such a case, but in ordinary practice generally it will not be found necessary to adjust the device down upon the pencil so far.

The tube A is here shown as made of a single piece of sheet metal cut out the proper shape and bent into the required shape but its clasp around the writing instrument is not complete but a little space is left at the joint to allow an elastic grip on the pencil or pen.

Any suitable attachment may be made instead of the tube A for the writing instrument so long as the results are obtained for producing the correct position as above described.

What I claim is:—

1. In a device of the class described, a spring clamp adapted for adjustment along the lower end portion of a writing implement and provided with an unyielding projection normally in front of the writing point and at a short distance from the paper when the implement is properly held.

2. A device of the class described, comprising a tube adapted to slide upon and grip a pencil, or the like, and provided with an arm projecting from its right side to rest at a distance from the writing point upon the writing plane, and further provided with a projection adapted to be adjusted to a position immediately above and in front of the writing point when the device is properly inclined for writing; whereby the projection meets the paper and the pencil is held above the paper when the pencil is in approximately vertical position.

3. In devices of the class described, a spring sleeve adapted for adjustment along the lower body portion of a writing implement and having an arm projecting from its right side to rest upon the paper near the line of writing and at a distance from the writing point, further having upon its upper side a cup for the finger tip, and also having a point normally slightly above the paper and in front of the writing point when the implement is used in proper position.

In witness whereof, I have hereunto subscribed my name at the city of Chicago, county of Cook and State of Illinois on this 10th day of November, 1908, in the presence of two subscribing witnesses.

CHARLES A. FAUST.

Witnesses:
JOHN GRANT,
W. O. BREWSTER.